Jan. 23, 1934.  C. R. CROFTON  1,944,406
RETINOSCOPE OR LIKE INSTRUMENT FOR ASCERTAINING
OBJECTIVELY THE REFRACTION OF EYES
Filed May 12, 1932
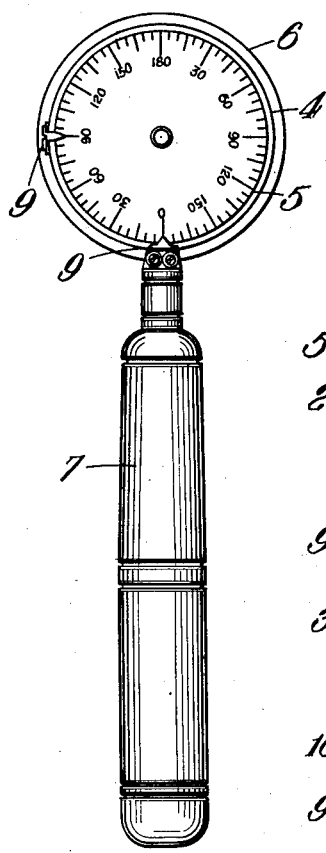
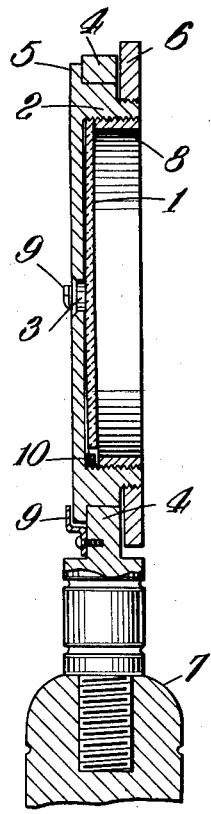
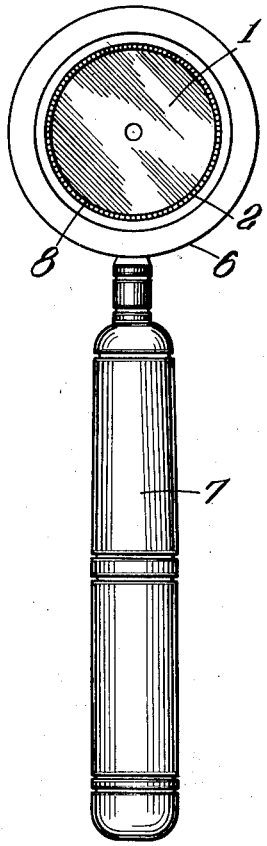
Cecil Richard Crofton
INVENTOR

UNITED STATES PATENT OFFICE 1,944,406

RETINOSCOPE OR LIKE INSTRUMENT FOR ASCERTAINING OBJECTIVELY THE REFRACTION OF EYES

Cecil Richard Crofton, Caernarvon, North Wales

Application May 12, 1932, Serial No. 610,777, and in Great Britain May 12, 1931

4 Claims. (Cl. 88—20)

The object of the invention is to provide such an instrument as will enable an astigmatic pencil of light to be projected into the observed eye and so focussed and controlled as to confine the apparent movement of the fundus reflex to one meridian at a time, and also to enable the operator to locate the principal meridians of an astigmatic eye and to maintain a check upon the working distance.

An instrument according to the present invention comprises a concave mirror of toric curvature, that is to say, the two principal meridians of which are of suitable different powers, whereby the light from a suitably placed small circular source such as is usually employed in retinoscopy may be reflected as an astigmatic pencil to form two line foci, one at one distance and the other at another distance from the mirror, and at right angles to each other. The two principal powers are chosen to give convenient alternative working distances, for example they may be +2.0 D and +3.0 D giving alternative working distances of 1 metre and 66.6 cm. The mirror is provided with a central sight window as is usual in instruments of this kind and means are also provided to indicate to the observer the angular position of the principal meridians of the mirror and therefore the orientation of the astigmatic pencil of light projected. Thus the mirror contained in a suitable cell may be mounted upon a holder, handle or stand in such manner that the mirror can be rotated upon its principal optical axis in relation to the holder handle or stand, and a scale and index may be provided to afford the said indication.

In the usual case of a silvered back glass mirror the two surfaces of the glass are optically worked to similar toric curvatures of corresponding axes but different sign in such a manner as to form a lens of zero power, the convex side being then silvered to complete the mirror.

A practical embodiment of the invention is illustrated in the accompanying drawing, in which Figure 1 is a front view,
Figure 2 a back view, and
Figure 3 a vertical section.

The mirror 1 is mounted in a recessed disc 2 having a central coned sight hole 3 in the back thereof corresponding with a central non-silvered sight window in the mirror. The disc is mounted for rotation in the ring 4, the assembly and retention in the ring being effected through the medium of the back flange 5 and screwing into the front flange 6, and the ring 4 is mounted on the handle 7. A retaining ring 8 for the mirror is screwed into the recessed portion of the said disc. The front flange 6 is milled around its edge to provide for easy rotation of the disc and mirror by the finger of the operator and the back of the disc is provided with a scale of degrees whereby the orientation of the mirror can be read off against pointers 9 mounted upon the ring 4. The correct setting of the astigmatic mirror with reference to the scale is effected by means of a small stud 10 at the edge of the recessed cell, corresponding to zero on the scale, and the mirror is slotted at its edge at a point on the 3.0 D meridian. This slot engages the stud in the cell and lines up the mirror with the scale.

The instrument is held in the hand with the handle vertical and the first finger resting on the serrated edge of the front flange 6 to rotate the mirror as desired. The following describes its method of use assuming the two principal powers of the mirror to be +2.0 D and +3.0 D, giving alternative working distances of 1 metre and 66.6 cm.

Working distance 1 metre:—

The light source will be in a plane with the observed eye i. e. both at 1 metre. The 2.0 D power meridian will then focus a line sharply on the observed cornea, and there will be no apparent movement of the reflex across this focal line when mirror is tilted. The 3.0 D power meridian will focus a real image of another focal line at right angles to the first, in the air, and at 50 cm. from the mirror. (Conjugate focus 3.0 D—1.0 D=2.0 D.) Tilting the mirror along the focal line seen on the cornea, will give the same movements as a concave short focus retinoscope. The reflex movement will be confined to the medidian indicated by the focal line along which the mirror is tilted. The reflex will appear as a red band in the pupil at right angles to the focal line on cornea. If there is astigmatism, and the focal line does not correspond to a principal meridian, the reflex edge and the focal line will be more or less oblique to each other. The mirror is rotated about its axis until the focal line and reflex band appear "all square" when a principal meridian is located. Neutralization can then be obtained with sphericals taking each principal meridian separately, or if preferred sphericals and cylindricals may be used.

When truly neutralized there will be no movement of reflex in any meridian and reflex band appearance will disappear.

Working distance at 66.6 cm.:—

The operation is similar, except that the 3.0 D power meridian is now focussed as a streak on the cornea, and the other weaker (2.0 D) meridian is tending to form a focus behind the patient's head at 2.0D−1.5D=0.5D or 200 cm. from mirror i. e. 200 cm.−66.6 cm.=133.3 cm. behind patient, and gives the effect of a long focus concave or plane mirror movements.

The notation scale at the back of instrument is arranged to indicate the direction of the more powerful focal line image in standard notation on the lower pointer. The actual axis of the correcting cylindrical may correspond or be at right angles to this, depending upon the sign of cylindrical used, and also whether 1 metre or 66.6 cm. working distance is used.

The second pointer at the side of the scale indicates the direction of the other principal meridian and provides a ready means of turning the mirror through 90° without any calculation; the reading on one pointer being simply transferred to the other.

As an obvious alternative detail of construction, a scale may be provided on the ring and an index pointer or pointers on the recessed disc.

I claim:

1. A retinoscope or like instrument for ascertaining objectively the refraction of eyes by aid of light from a source of light, said instrument comprising a concave mirror of toric curvature, the two principal meridians of which are of suitable different powers to reflect the light from said source as an astigmatic pencil to form two line foci at different distances and to provide and determine suitable alternative working distances.

2. A retinoscope or like instrument according to claim 1, comprising a silvered back glass mirror the two surfaces of the glass being optically worked to similar toric curvatures of corresponding axes but different sign to form a lens of zero power, and the convex side being silvered to complete the mirror.

3. A retinoscope or like instrument according to claim 1, wherein the two principal powers of the mirror are +2.0 D and +3.0 D.

4. A retinoscope or like instrument according to claim 1, wherein the mirror is fixed in a suitable cell, a handle, means for mounting said mirror for rotation about its principal optical axis upon said handle, and a scale and index to indicate the angular position of the principal meridians of the mirror.

CECIL RICHARD CROFTON.